United States Patent
Okuno et al.

(10) Patent No.: US 8,042,815 B2
(45) Date of Patent: Oct. 25, 2011

(54) CYLINDER HEAD GASKET AND ENGINE

(75) Inventors: Yoshihiro Okuno, Kariya (JP); Kazuya Yoshijima, Okazaki (JP); Tsutomu Endou, Yamato (JP); Tetsuya Hida, Yamato (JP)

(73) Assignees: Kabushiki Kaisha Toyota Jidoshokki, Aichi-ken (JP); Toyota Jidosha Kabushiki Kaisha, Aichi-ken (JP); Nippon Reinz Co., Ltd., Kanagawa-ken (JP)

( * ) Notice: Subject to any disclaimer, the term of this patent is extended or adjusted under 35 U.S.C. 154(b) by 152 days.

(21) Appl. No.: 12/524,497

(22) PCT Filed: Jan. 31, 2008

(86) PCT No.: PCT/JP2008/051532
§ 371 (c)(1),
(2), (4) Date: Jul. 24, 2009

(87) PCT Pub. No.: WO2008/093779
PCT Pub. Date: Aug. 7, 2008

(65) Prior Publication Data
US 2010/0117306 A1    May 13, 2010

(30) Foreign Application Priority Data
Jan. 31, 2007    (JP) .................................. 2007-022202

(51) Int. Cl.
*F02F 11/00*    (2006.01)

(52) U.S. Cl. .................................................. 277/593
(58) Field of Classification Search ........... 277/593–595
See application file for complete search history.

(56) References Cited

U.S. PATENT DOCUMENTS

| | | | | |
|---|---|---|---|---|
| 5,286,039 | A * | 2/1994 | Kawaguchi et al. | 277/593 |
| 6,769,696 | B2 * | 8/2004 | Diez et al. | 277/593 |
| 7,815,197 | B2 * | 10/2010 | Ueta | 277/593 |
| 2004/0183260 | A1 | 9/2004 | Kestly | |

FOREIGN PATENT DOCUMENTS

| | | |
|---|---|---|
| JP | 05-263940 A | 10/1993 |
| JP | 07-055005 A | 3/1995 |
| JP | 2004-286213 A | 10/2004 |

* cited by examiner

*Primary Examiner* — Vishal Patel
(74) *Attorney, Agent, or Firm* — Locke Lord Bissell & Liddell LLP

(57) ABSTRACT

The thickness of an intermediate plate portion (31*b*) is smaller than the thickness of a stopper portion (31*a*). The thickness of a portion of a cylinder head gasket (20) having the stopper portion (31*a*) is set to be greater than the thickness of other portions of the cylinder head gasket (20). Before the cylinder head gasket (20) is provided between contact surfaces (12*a*, 13*a*), a space (S) is formed between the stopper portion (31*a*) and an adjustment stopper portion (32*a*), and the intermediate plate portion (31*b*) partially contacts the adjustment plate portion, and a bead (33*a*) contacts the adjustment plate portion (32*b*).

7 Claims, 5 Drawing Sheets

Fig.11

CYLINDER HEAD GASKET AND ENGINE

FIELD OF THE INVENTION

The present invention relates to a cylinder head gasket that is provided between contact surfaces of a cylinder head and a cylinder block.

BACKGROUND OF THE INVENTION

Figure 7:
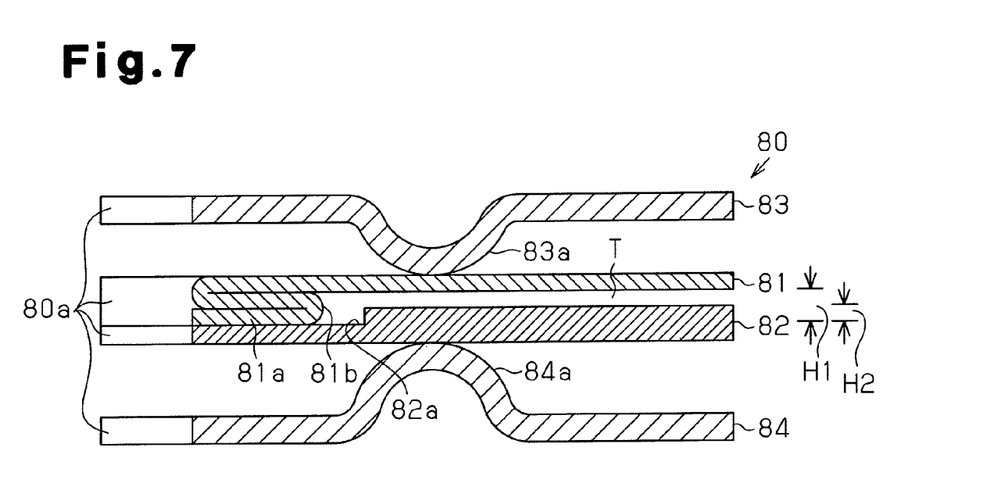
FIG. 7 is a partial cross-sectional view of a conventional cylinder head gasket.
Figure 8:
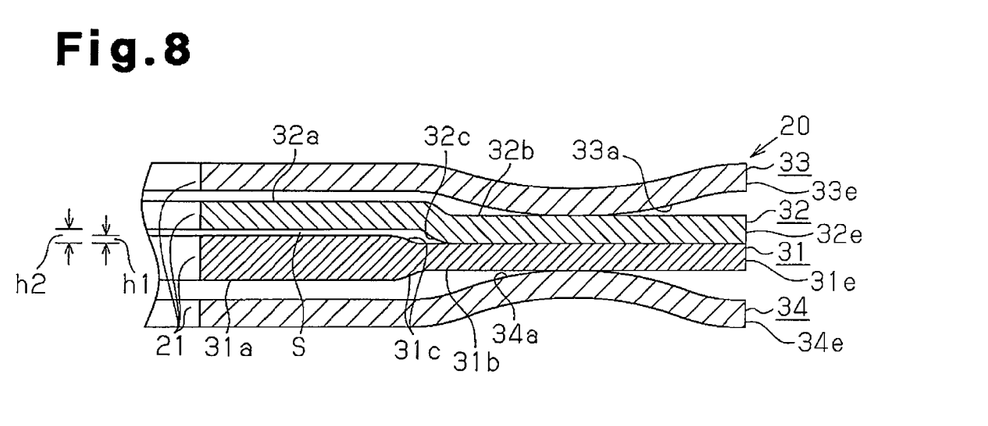
FIG. 8 is a partial cross-sectional view of a modification of the cylinder head gasket in FIG. 3.
Figure 9:
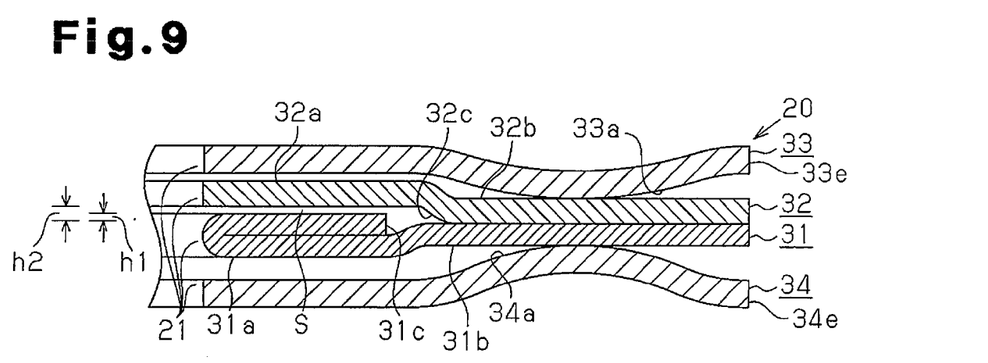
FIG. 9 is a partial cross-sectional view of a modification of the cylinder head gasket in FIG. 4.
Figure 10:
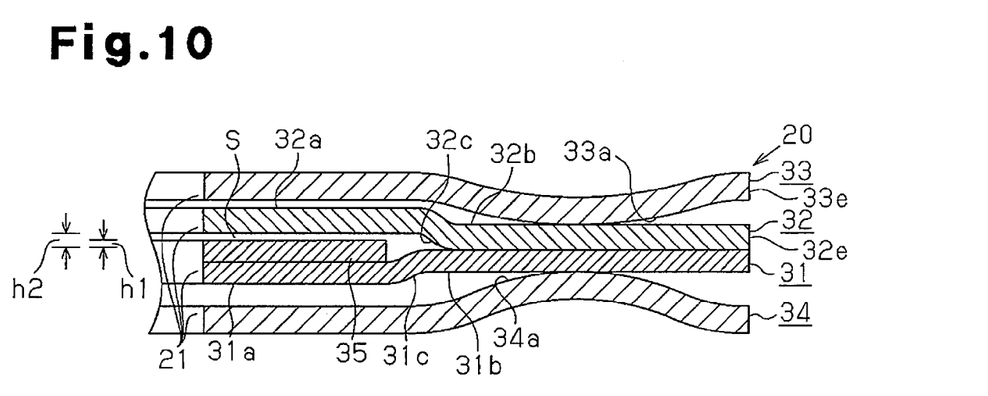
FIG. 10 is a partial cross-sectional view of a modification of the cylinder head gasket in FIG. 5.
Figure 11:
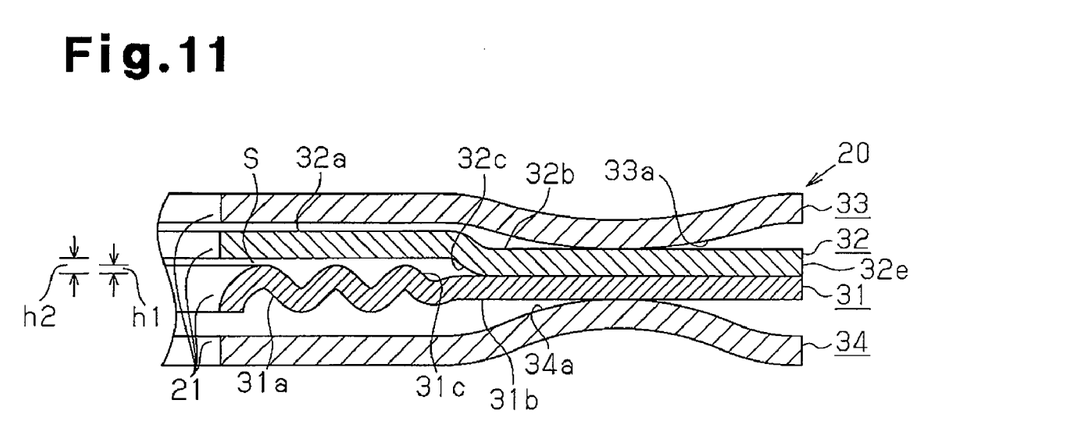
FIG. 11 is a partial cross-sectional view of a modification of the cylinder head gasket in FIG. 6.

Patent Document 1 discloses a cylinder head gasket 80 that is shown in FIG. 7 of the present application. The cylinder head gasket 80 is a metal gasket having a laminated structure. The cylinder head gasket 80 has an intermediate plate 81 and an adjustment plate 82 that are laminated on each other, and bead plates 83, 84 that sandwich the intermediate plate 81 and the adjustment plate 82. The intermediate plate 81 and the cylinder head sandwich the bead plate 83 and the adjustment plate 82 and the cylinder block sandwich the bead plate 84.

The cylinder head gasket 80 has a plurality of combustion chamber openings 80a each of which corresponds to one of the cylinder bores formed in the cylinder block. The bead plates 83, 84 have beads 83a, 84a each of which surrounds the combustion chamber opening 80a. If the cylinder head is fixed to the cylinder block by a bolt in a state where the cylinder head gasket 80 is provided between contact surfaces of the cylinder head and the cylinder block, the bead 83a seals a space between the cylinder head and the intermediate plate 81, and the bead 84a seals a space between the cylinder block and the adjustment plate 82.

The intermediate plate 81 has a stopper portion 81a that is provided around the combustion chamber opening 80a. The stopper portion 81a receives axial fastening force of the bolt to inhibit the beads 83a, 84a from fully collapsing. That is, the stopper portion 81a compensates for the space between the contact surfaces of the cylinder head and the cylinder block that is formed by deformation of the cylinder head gasket 80 due to the fastening force of the bolt. The adjustment plate 82 adjusts the thickness of the cylinder head gasket 80 such that the thickness of the cylinder head gasket 80 becomes equal to the space between the contact surfaces of the cylinder head and the cylinder block. The adjustment plate 82 has a recess 82a to which the stopper portion 81a is fitted. In the above publication, the intermediate plate 81 is referred to as a "compensation plate", and the stopper portion 81a is referred to as a "folded portion".

The thickness of the stopper portion 81a is greater than the thickness of other portions of the intermediate plate 81. The stopper portion 81a protrudes along its thickness toward the adjustment plate 82. A step 81b is formed between the stopper portion 81a and the other portions of the intermediate plate 81. The measurement along the thickness between the intermediate plate 81 and the stopper portion 81a is referred to as a stopper height H1, and the measurement along the thickness of the recess 82a is referred to as an adjustment step height H2. The stopper height H1 is greater than the adjustment step height H2.

Therefore, when the cylinder head is fastened to the cylinder block with the bolt, the stopper portion 81a closely contacts the adjustment plate 82. However, a space T is formed between the intermediate plate 81 and the adjustment plate 82 in the vicinity of the step 81b. If the cylinder head gasket 80 receives pressure fluctuation in the cylinder bore or the repetition of cooling and heating in a state where the space T is formed, the adjustment plate 82 may flap.

Patent Document 1: Japanese Laid-Open Patent Publication No. 7-55005

SUMMARY OF THE INVENTION

An objective of the present invention is to provide a cylinder head gasket that inhibits flapping of an adjustment plate.

According to one aspect of the present invention, cylinder head gasket that is provided between a contact surface of a cylinder head and a contact surface of a cylinder block, which are connected to each other, is provided. The cylinder block has a cylinder bore. A combustion chamber opening is formed in the cylinder head gasket so as to correspond to the cylinder bore. The cylinder head gasket has an intermediate plate having a stopper portion that is positioned around the combustion chamber opening. The intermediate plate has an intermediate plate portion that is positioned at the outer side of the stopper portion with respect to the combustion chamber opening. The thickness of the intermediate plate portion is smaller than the thickness of the stopper portion. An intermediate step is formed, as a step portion, at the boundary between the stopper portion and the intermediate plate portion. An adjustment plate is provided closer to the cylinder head or to the cylinder block with respect to the intermediate plate. The adjustment plate has an adjustment stopper portion facing the stopper portion and an adjustment plate portion facing the intermediate plate portion. An adjustment step is formed, as a step facing the intermediate step, at the boundary between the adjustment stopper portion and the adjustment plate portion. A bead plate is provided between the adjustment plate and the cylinder head or between the adjustment plate and the cylinder block. The bead plate has a bead that surrounds the combustion chamber opening at the outer side of the stopper portion with respect to the combustion chamber opening. The intermediate plate, the adjustment plate, and the bead plate are laminated to each other. The thickness of a portion of the cylinder head gasket that has the stopper portion is set to be greater than the thickness of other portions of the cylinder head gasket. Before the cylinder head gasket is provided between the contact surfaces, a space is formed between the stopper portion and the adjustment stopper portion, and the intermediate plate portion at least partially contacts the adjustment plate portion, and the bead contacts the adjustment plate portion.

DETAILED DESCRIPTION OF THE PREFERRED EMBODIMENTS

Figure 1:
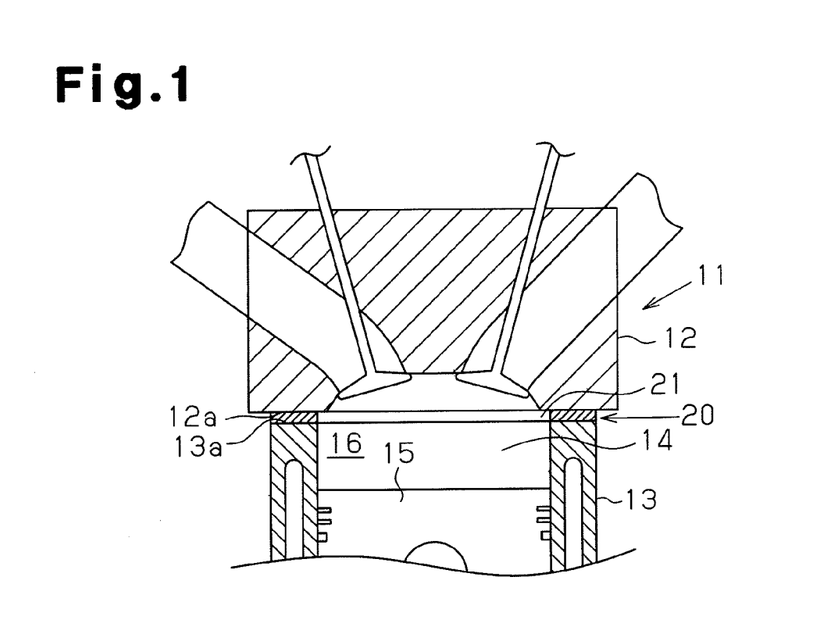
FIG. 1 is a partial cross-sectional view of an engine having a cylinder head gasket according to one embodiment of the present invention.
Figure 2:
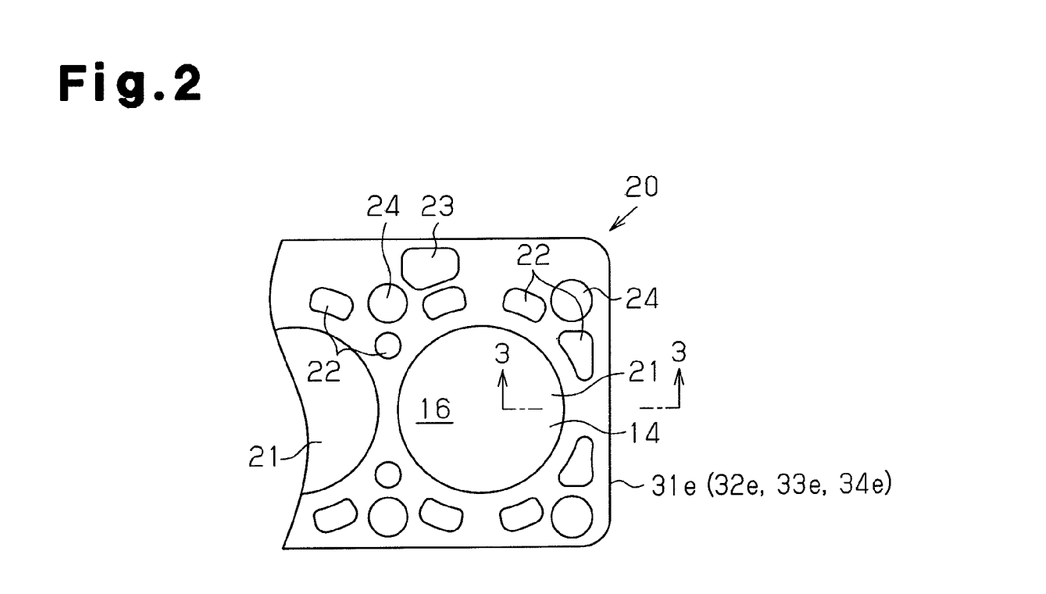
FIG. 2 is a partial plan view of the cylinder head gasket of FIG. 1.
Figure 3:
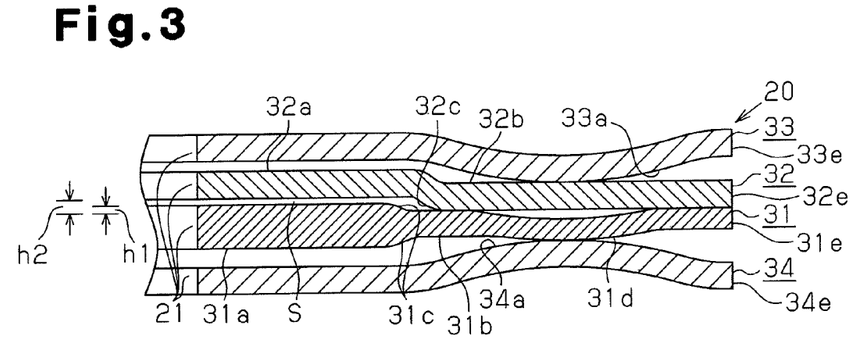
FIG. 3 is a cross-sectional view taken along a 3-3 line of FIG. 2.

FIGS. 1 to 3 show a cylinder head gasket 20 according to one embodiment of the present invention.

FIG. 1 shows an engine 11 to which the cylinder head gasket 20 is attached. The engine 11 has a cylinder block 13 and a cylinder head 12 that is joined to the cylinder block 13. A head contact surface 12a, which is a contact surface of the cylinder head 12, faces a block contact surface 13a, which is a contact surface of the cylinder block 13. The cylinder block 13 has a plurality of cylinder bores 14, and each cylinder bore 14 accommodates a piston 15 so as to reciprocate therein. A peripheral surface of each cylinder bore 14, an upper surface of the piston 15, and a lower surface of the cylinder head 12 defines a combustion chamber 16.

The cylinder head gasket 20 is formed in a rectangular plate shape that is arranged between the head contact surface 12a and the block contact surface 13a.

As shown in FIG. 2, the cylinder head gasket 20 has a plurality of combustion chamber openings 21, coolant passage openings 22, oil passage openings 23, and bolt insertion openings 24. The combustion chamber openings 21 and the bolt insertion openings 24 are circular. When the cylinder head gasket 20 is arranged between the head contact surface 12a and the block contact surface 13a, each combustion chamber opening 21 corresponds to one of the cylinder bores 14.

As shown in FIG. 3, the cylinder head gasket 20 has a laminated structure having an intermediate plate 31, an adjustment plate 32, a head bead plate 33, and a block bead plate 34 that are laminated on each other. The block bead plate 34, the intermediate plate 31, the adjustment plate 32, and the head bead plate 33 are laminated on each other in this order. That is, the cylinder block 13, the block contact surface 13a, the block bead plate 34, the intermediate plate 31, the adjustment plate 32, the head bead plate 33, the head contact surface 12a, and the cylinder head 12 are arranged in this order. The intermediate plate 31, the adjustment plate 32, the head bead plate 33 and the block bead plate 34 are formed in a rectangular plate and each have an edge 31e, 32e, 33e, 34e as an outline. Each of the combustion chamber openings 21 extends through the block bead plate 34, the intermediate plate 31, the adjustment plate 32, and the head bead plate 33.

The intermediate plate 31 shown in FIG. 3 is made of metal and is formed by an iron plate or a stainless steel plate. The intermediate plate 31 has a stopper portion 31a and an intermediate plate portion 31b. The stopper portion 31a is positioned around the combustion chamber openings 21. The intermediate plate portion 31b is positioned between the stopper portion 31a and a side edge 31e of the intermediate plate 31. A direction away from the combustion chamber opening 21 is referred to as outward. It can be said that the intermediate plate portion 31b is positioned outside the stopper portion 31a.

As shown in FIG. 3, the measurement of the cylinder head gasket 20 along its normal line is referred to as a thickness. In other words, the lamination direction of the intermediate plate 31, the adjustment plate 32, the head bead plate 33, and the block bead plate 34 is the thickness direction of the cylinder head gasket 20. The thickness of the stopper portion 31a is greater than the thickness of the intermediate plate portion 31b. In other words, the thickness of the intermediate plate 31 in the stopper portion 31a is different from that in the intermediate plate portion 31b. The thickness of the intermediate plate portion 31b is within an area between two surfaces of the stopper portion 31a in its thickness direction. The cylinder head gasket 20 has an intermediate step 31c that is a step positioned at a boundary between the stopper portion 31a and the intermediate plate portion 31b. The height of the intermediate step 31c is referred to as a stopper height h1. The stopper height h1 represents the measurement along the thickness between a surface of the stopper portion 31a facing the adjustment plate 32 and a surface of the intermediate plate portion 31b facing the adjustment plate 32.

In the present embodiment, the thickness of one plate changes at a certain portion so as to form the stopper portion 31a and the intermediate plate portion 31b having different thicknesses. Accordingly, the intermediate step 31c has two inclined tapered surfaces so as to increase the width between the surfaces from the intermediate plate portion 31b toward the stopper portion 31a. The intermediate plate portion 31b is positioned between the intermediate step 31c and the side edge 31e of the intermediate plate 31. The intermediate plate portion 31b is positioned closer to the side edge 31e of the intermediate plate 31 than the intermediate step 31c. The intermediate plate portion 31b is a portion of the intermediate plate 31 other than the stopper portion 31a and the intermediate step 31c.

The intermediate plate portion 31b has an intermediate bead 31d that is curved to be convex toward the block bead plate 34.

The adjustment plate 32 shown in FIG. 3 is made of metal and is an iron plate or a stainless steel plate. The adjustment plate 32 has an adjustment stopper portion 32a and an adjustment plate portion 32b. The adjustment stopper portion 32a is a first facing portion facing the stopper portion 31a and positioned around the combustion chamber opening 21. The adjustment plate portion 32b is a second facing portion facing the intermediate plate portion 31b. The adjustment plate portion 32b is positioned between the adjustment stopper portion 32a and a side edge 32e of the adjustment plate 32. The adjustment plate portion 32b is positioned at the outer side of the adjustment stopper portion 32a.

As shown in FIG. 3, the adjustment plate 32 is bent at a portion between the adjustment stopper portion 32a and the adjustment plate portion 32b. The measurement along the thickness between the adjustment stopper portion 32a and the intermediate plate portion 31b is greater than the measurement along the thickness between the adjustment plate portion 32b and the intermediate plate portion 31b. The thickness of the adjustment stopper portion 32a is equal to the thickness of the adjustment plate portion 32b. The adjustment step 32c is inclined from the adjustment stopper portion 32a toward the adjustment plate portion 32b. A bent portion of the adjustment plate 32 between the adjustment stopper portion 32a and the adjustment plate portion 32b is referred to as an adjustment step 32c. The adjustment step 32c faces the intermediate step 31c.

The height of the adjustment step 32c is referred to as an adjustment step height h2. The adjustment step height h2 represents the measurement along the thickness between a surface of the adjustment stopper portion 32a facing the intermediate plate 31 and a surface of the adjustment plate portion 32b facing the intermediate plate 31. The stopper height h1 is set to be smaller than the adjustment step height h2.

The adjustment plate portion 32b is positioned between the adjustment step 32c and the side edge 32e of the adjustment plate 32. In other words, the adjustment plate portion 32b is positioned closer to the side edge 32e of the adjustment plate 32 than the adjustment step 32c. The adjustment plate portion 32b is a portion of the adjustment plate 32 other than the adjustment stopper portion 32a and the adjustment step 32c.

The head bead plate 33 and the block bead plate 34 are formed of a metal plate such as a stainless steel plate so as to have elasticity. The head bead plate 33 has a head bead 33a and the block bead plate 34 has a block bead 34a. The head bead 33a and the block bead 34a surround the combustion chamber openings 21 at the outer side of the stopper portion 31a. The head bead 33a is positioned between the combustion chamber openings 21 and the side edge 33e of the head bead plate 33, and the block bead 34a is positioned between the combustion chamber openings 21 and the side edge 34e of the block bead plate 34. The head bead 33a and the block bead 34a are bent so as to be closer to each other and sandwich the intermediate plate portion 31b and the adjustment plate portion 32b. In other words, the head bead 33a is bent to be convex toward the adjustment plate portion 32b and the block bead 34a is bent to be convex toward the intermediate plate portion 31b.

When the cylinder head gasket 20 is manufactured, the intermediate plate 31, the adjustment plate 32, the head bead plate 33 and the block bead plate 34 are integrally installed. Before the cylinder head gasket 20 is provided between the head contact surface 12a and the block contact surface 13a, the intermediate plate portion 31b and the head bead 33a sandwich the adjustment plate portion 32b as shown in FIG. 3. That is, a portion of the intermediate plate portion 31b other than the intermediate bead 31d contacts the adjustment plate portion 32b and the head bead 33a contacts the adjustment plate portion 32b.

Since the stopper height h1 is smaller than the adjustment step height h2, a small space S is formed between the stopper portion 31a and the adjustment stopper portion 32a in a state where the intermediate plate portion 31b contacts the adjustment plate portion 32b. The measurement along the thickness of the space S is considered to be the difference between the adjustment step height h2 and the stopper height h1.

The stopper thickness S1, which is the total of the thickness of the stopper portion 31a, the adjustment stopper portion 32a, the head bead plate 33, and the block bead plate 34, is set to be greater than the bead thickness S2, which is the total of the thickness of the intermediate plate portion 31b, the adjustment plate portion 32b, the head bead plate 33, and the block bead plate 34 (S1>S2). The stopper thickness S1 represents the thickness of a portion of the cylinder head gasket 20 having the stopper portion 31a. The bead thickness S2 represents a portion of the cylinder head gasket 20 having the intermediate bead 31d, the head bead 33a, and the block bead 34a. The stopper thickness S1 is greater than the thickness of a portion of the cylinder head gasket 20 other than the portion of the cylinder head gasket 20 having the stopper portion 31a.

By fastening the cylinder head 12 to the cylinder block 13 with bolts in a state where the cylinder head gasket 20 is arranged between the head contact surface 12a and the block contact surface 13a, the cylinder head gasket 20 is mounted to a space between the head contact surface 12a and the block contact surface 13a. The stopper portion 31a receives the axial fastening force due to the fastening of the bolt. This prevents the head bead plate 33 and the block bead plate 34 from fully collapsing.

Due to the fastening of the bolt, the head bead 33a is pressed against the adjustment plate portion 32b and the head contact surface 12a, and the block bead 34a is pressed against the intermediate bead 31d and the block contact surface 13a. Therefore, the intermediate bead 31d, the head bead 33a, and the block bead 34a seal a space between the head contact surface 12a and the block contact surface 13a with high linear pressure. Accordingly, high pressure gas in the combustion chambers 16 is sealed.

While the engine 11 is running, a space may be formed between the head contact surface 12a and the block contact surface 13a, and the space may be increased or reduced. However, in the present embodiment, since the stopper thickness S1 is greater than the bead thickness S2, the intermediate bead 31d, the head bead 33a and the block bead 34a follow the increasing or reducing of the space that may be formed between the head contact surface 12a and the block contact surface 13a. Accordingly, the cylinder head gasket 20 maintains high sealing linear pressure between the cylinder head 12 and the cylinder block 13.

Before the cylinder head gasket 20 is mounted to a space between the head contact surface 12a and the block contact surface 13a, portions of the facing surfaces of the intermediate plate portion 31b and the adjustment plate portion 32b contact each other, and a space S is formed between the facing surfaces of the stopper portion 31a and the adjustment stopper portion 32a. When the cylinder head 12 is fixed to the cylinder block 13 by bolts, the portion closer to the stopper portion 31a is compressed by the axial fastening force of the bolts, and the stopper portion 31a and the adjustment stopper portion 32a closely contact each other. This eliminates the space S. At this time, since the facing surfaces of the intermediate plate portion 31b and the adjustment plate portion 32b have contacted each other before the fastening of the bolt, the facing surfaces contact each other after the fastening of the bolt. Therefore, even if the cylinder head gasket 20 receives the pressure fluctuation in the cylinder bore 14 or the repetition of cooling and heating, the adjustment plate portion 32b contacts the intermediate plate portion 31 and the head bead 33a. This inhibits the adjustment plate portion 32b from violently flapping.

The present embodiment has following advantages.

(1) Before the cylinder head gasket 20 is mounted between the head contact surface 12a and the block contact surface 13a, the intermediate plate portion 31b is formed to have a portion that contacts the adjustment plate portion 32b and to cause the head bead 33a to contact the adjustment plate portion 32b. Therefore, in a state where the cylinder head gasket 20 is mounted to a space between the head contact surface 12a and the block contact surface 13a, the cylinder head gasket 20 maintains a state where the intermediate plate portion 31b contacts the adjustment plate portion 32b and the adjustment plate portion 32b contacts the head bead 33a. Therefore, even if the pressure fluctuation in the cylinder bore 14 or the repetition of cooling and heating of the engine 11 may be caused, the flapping of the adjustment plate 32 is inhibited, and especially the flapping of the adjustment plate portion 32b is inhibited.

(2) Therefore, for example, the adjustment step portion 32c is prevented from repeatedly hitting the head bead plate 33, and the head bead plate 33 is prevented from being damaged. Also, for example, the adjustment stopper portion 32a is prevented from flapping and from being hit by the stopper portion 31a. The adjustment stopper portion 32a is thus inhibited from being depressed.

(3) The intermediate step 31c is formed by making the thickness of the intermediate plate 31 different between the stopper portion 31a and the intermediate plate portion 31b. When the adjustment stopper portion 32a is apart from the stopper portion 31a in a state where the adjustment plate 32 is placed on the intermediate plate 31, the adjustment plate portion 32b easily contacts the intermediate plate portion 31b.

In the present embodiment, the adjustment plate portion 32b reliably contacts the intermediate plate portion 31b by setting the stopper height h1 to be smaller than the adjustment step height h2.

(4) To cause the intermediate plate portion 31b to contact the adjustment plate portion 32b, it is ideal that the stopper height h1 is equal to the adjustment step height h2. However, it is not realistic to set the stopper height h1 to be equal to the adjustment step height h2 due to the manufacturing error or the manufacturing cost. In the present embodiment, since the stopper height h1 is set to be smaller than the adjustment step height h2, the space S may be formed between a space between the stopper portion 31a and the adjustment stopper portion 32a before the cylinder head gasket 20 is mounted to the space between the head contact surface 12a and the block contact surface 13a. However, the space S can be eliminated by the fastening of the bolt. Therefore, according to the present embodiment, the manufacturing cost is prevented from increasing, and the intermediate plate portion 31b reliably contacts the adjustment plate portion 32b.

(5) The intermediate plate 31 has the intermediate bead 31d, which protrudes toward the block bead plate 34. Therefore, the intermediate plate portion 31b reliably contacts the adjustment plate portion 32b.

(6) The cylinder head gasket 20 has the head bead plate 33 and the block bead plate 34. Therefore, the space between the head contact surface 12a and the cylinder head gasket 20 is easily sealed, and the space between the block contact surface 13a and the cylinder head gasket 20 is easily sealed. This improves the sealing property of the combustion chamber openings 21.

The present embodiment may be modified in the following forms.

The method of forming the stopper portion 31a and the intermediate plate portion 31b is not limited to partially increasing the thickness of one metal plate forming the intermediate plate 31.

Figure 4:
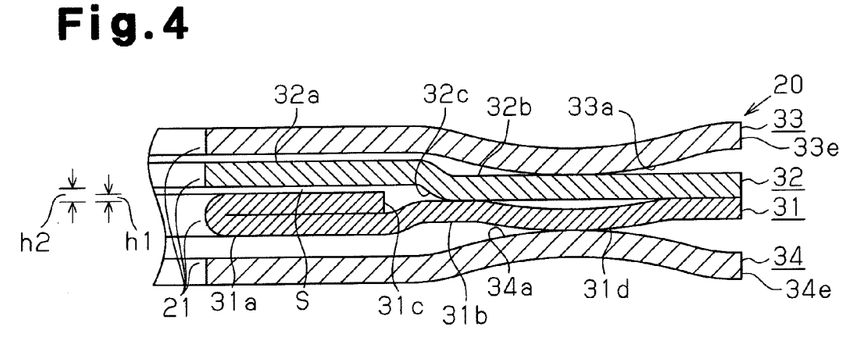
FIG. 4 is a partial cross-sectional view of a cylinder head gasket of a modification of the present invention.

FIG. 4 shows a stopper portion 31a that is formed by folding one plate. In other words, the stopper portion 31a is formed by folding a portion of the metal plate forming the intermediate plate 31 that is closer to the combustion chamber opening 21. When the folded portion faces the adjustment plate 32, the stopper height h1 represents the measurement along the thickness between the folded portion and the intermediate plate portion 31b.

Figure 5:
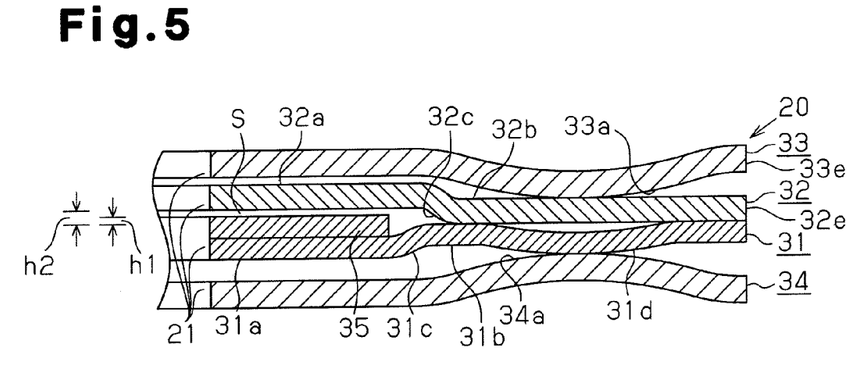
FIG. 5 is a partial cross-sectional view of a cylinder head gasket of another modification.

FIG. 5 shows a stopper portion 31a that is formed by joining two plates. That is, another metal plate 35 is welded to a portion of the metal plate forming the intermediate plate 31 that is closer to the combustion chamber openings 21. When the metal plate 35 faces the adjustment plate 32, the stopper height h1 represents the measurement along the thickness between the adjustment plate 32 and the intermediate plate portion 31b.

Figure 6:
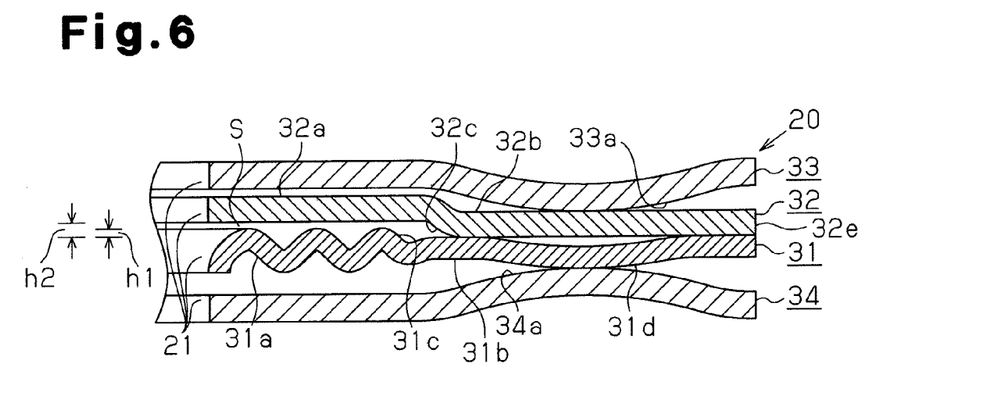
FIG. 6 is a partial cross-sectional view of the cylinder head gasket of a further modification.

FIG. 6 shows a stopper portion 31a that is formed by repeatedly bending one plate so as to have a corrugated form.

For example, the bent portion is formed by bending a portion of the metal plate forming the intermediate plate 31 that is closer to the combustion chamber opening 21 so as to have a corrugated form and to increase the height corrugation toward the combustion chamber opening 21.

The cylinder head gasket 20 do not necessarily need to have the block bead plate 34, the intermediate plate 31, the adjustment plate 32, and the head bead plate 33 arranged in this order from the cylinder block 13 to the cylinder head 12. The order of the intermediate plate 31 and the adjustment plate 32 may be opposite. In this case, the intermediate bead 31d protrudes toward the cylinder head 12.

The head bead plate 33 may be omitted. That is, the cylinder head gasket 20 may have a three-layer structure having the block bead plate 34, the intermediate plate 31 and the adjustment plate 32 arranged in this order from the cylinder block 13 to the cylinder head 12. In this case, the stopper thickness S1 of the cylinder head gasket 20 is the total of the thicknesses of the stopper portion 31a, the adjustment stopper portion 32a and the block bead plate 34. The bead thickness S2 is the total of the thicknesses of the intermediate plate portion 31b, the adjustment plate portion 32b and the block bead plate 34.

The block bead plate 34 may be omitted. That is, the cylinder head gasket 20 may have a three-layer structure having the intermediate plate 31, the adjustment plate 32, and the head bead plate 33 arranged in this order from the cylinder block 13 to the cylinder head 12.

The cylinder head gasket 20 may further have a third bead plate in addition to the head bead plate 33 and the block bead plate 34.

The head bead 33a is not necessarily formed by protruding toward the cylinder block 13 but formed by protruding toward the cylinder head 12.

The intermediate bead 31d may be omitted. In this case, if the intermediate plate portion 31b is a flat plate, the whole surface of the intermediate plate portion 31b can contact the adjustment plate portion 32b before the mounting of the cylinder head gasket 20.

The invention claimed is:

1. A cylinder head gasket that is provided between a contact surface of a cylinder head and a contact surface of a cylinder block, which are connected to each other, wherein the cylinder block has a cylinder bore, and a combustion chamber opening is formed in the cylinder head gasket so as to correspond to the cylinder bore, the cylinder head gasket being characterized by:

an intermediate plate having a stopper portion that is provided around the combustion chamber opening, the intermediate plate having an intermediate plate portion that is positioned at the outer side of the stopper portion with respect to the combustion chamber opening, wherein the thickness of the intermediate plate portion is smaller than the thickness of the stopper portion, and an intermediate step is formed, as a step portion, at the boundary between the stopper portion and the intermediate plate portion;

an adjustment plate that is provided closer to the cylinder head or to the cylinder block with respect to the intermediate plate, the adjustment plate having an adjustment stopper portion facing the stopper portion and an adjustment plate portion facing the intermediate plate portion, wherein an adjustment step is formed, as a step facing the intermediate step, at the boundary between the adjustment stopper portion and the adjustment plate portion, wherein the height of the intermediate step from the intermediate plate portion to the adjustment plate is set to be smaller than the height of the adjustment step from the adjustment plate portion to the intermediate plate; and a bead plate that is provided between the adjustment plate and the cylinder head or between the adjustment plate and the cylinder block, the bead plate having a bead that surrounds the combustion chamber opening at the outer side of the stopper portion with respect to the combustion chamber opening, wherein the intermediate plate, the adjustment plate, and the bead plate are laminated on each other and the thickness of a portion of the cylinder head gasket that has the stopper portion is set to be greater than the thickness of other portions of the cylinder head gasket, wherein the cylinder head gasket is formed such that, before the cylinder head gasket is provided between the contact surfaces, a space is formed between the stopper portion and the adjustment stopper portion, and that the intermediate plate portion at least partially contacts the adjustment plate portion, and the bead contacts the adjustment plate portion, and wherein the intermediate plate portion has an intermediate bead that is a bead surrounding the combustion chamber opening at the outer side of the stopper portion, and a portion of the intermediate plate portion other than the intermediate bead contacts the adjustment plate portion.

2. The cylinder head gasket according to claim 1, wherein the intermediate bead is formed to protrude toward the cylinder block when the intermediate plate is provided between the adjustment plate and the cylinder block, and wherein the intermediate bead is formed to protrude toward the cylinder head when the intermediate plate is provided between the adjustment plate and the cylinder head.

3. The cylinder head gasket according to claim 1, wherein before the cylinder head gasket is provided between the contact surfaces, and when the intermediate plate and the adjustment plate are laminated on each other, the space formed between the stopper portion and the adjustment stopper portion exists over whole surfaces of the stopper portion and the adjustment stopper portion facing each other.

4. A cylinder head gasket that is provided between a contact surface of a cylinder head and a contact surface of a cylinder block, which are connected to each other, wherein the cylinder block has a cylinder bore, and a combustion chamber opening is formed in the cylinder head gasket so as to correspond to the cylinder bore, the cylinder head gasket being characterized by:

an intermediate plate having a stopper portion that is provided around the combustion chamber opening, the intermediate plate having an intermediate plate portion that is positioned at the outer side of the stopper portion with respect to the combustion chamber opening, wherein the thickness of the intermediate plate portion is smaller than the thickness of the stopper portion, and an intermediate step is formed, as a step portion, at the boundary between the stopper portion and the intermediate plate portion;

an adjustment plate that is provided closer to the cylinder head or to the cylinder block with respect to the intermediate plate, the adjustment plate having an adjustment stopper portion facing the stopper portion and an adjustment plate portion facing the intermediate plate portion, wherein an adjustment step is formed, as a step facing the intermediate step, at the boundary between the adjustment stopper portion and the adjustment plate portion, wherein the height of the intermediate step form the intermediate plate portion to the adjustment plate is set to be smaller than the height of the adjustment step form the adjustment plate portion to the intermediate plate; and a bead plate that is provided between the adjustment plate and the cylinder head or between the adjustment plate and the cylinder block, the bead plate having a bead that surrounds the combustion chamber opening at the outer side of the stopper portion with respect to the combustion chamber opening, wherein the intermediate plate, the adjustment plate, and the bead plate are laminated on each other and the thickness of a portion of the cylinder head gasket that has the stopper portion is set to be greater than the thickness of other portions of the cylinder head gasket, wherein the cylinder head gasket is formed such that, before the cylinder head gasket is provided between the contact surfaces, a space is formed between the stopper portion and the adjustment stopper portion, and that the intermediate plate portion at least partially contacts the adjustment plate portion, and the bead contacts the adjustment plate portion, and wherein the intermediate plate portion is a flat plate, the adjustment step being a single step, wherein the height of the intermediate step from the intermediate plate portion to the adjustment plate is set to be smaller than the height of the adjustment step from the adjustment plate portion to the intermediate plate, and wherein the whole surface of the intermediate plate portion is capable of contacting the adjustment plate portion before the cylinder head gasket is provided between the contact surfaces.

5. The cylinder head gasket according to claim 4, further comprising a bead plate that is provided between the intermediate plate and the cylinder block or between the intermediate plate and the cylinder head, wherein the bead plate has a bead that surrounds the combustion chamber opening at an outer side of the stopper portion.

6. An engine characterized by:

a cylinder block having a cylinder bore;

a cylinder head that is connected to the cylinder block; and a cylinder head gasket that is provided between a contact surface of the cylinder head and a contact surface of the cylinder block, which contact each other, wherein a combustion chamber opening is formed in the cylinder head gasket so as to correspond to the cylinder bore, the cylinder head gasket including:

an intermediate plate having a stopper portion that is provided around the combustion chamber opening, the intermediate plate having an intermediate plate portion that is positioned at the outer side of the stopper portion with respect to the combustion chamber opening, wherein the thickness of the intermediate plate portion is smaller than the thickness of the stopper portion, and an intermediate step is formed, as a step portion, at the boundary between the stopper portion and the intermediate plate portion;

an adjustment plate that is provided closer to the cylinder head or to the cylinder block with respect to the intermediate plate, the adjustment plate having an adjustment stopper portion facing the stopper portion and an adjustment plate portion facing the intermediate plate portion, wherein an adjustment step is formed, as a step facing the intermediate step, at the boundary between the adjustment stopper portion and the adjustment plate portion, wherein the height of the intermediate step from the intermediate plate portion to the adjustment plate is set to be smaller than the height of the adjustment step from the adjustment plate portion to the intermediate plate; and a bead plate that is provided between the adjustment plate and the cylinder head or between the adjustment plate and the cylinder block, the bead plate having a bead that surrounds the combustion chamber opening at the outer side of the stopper portion with respect to the combustion chamber opening, wherein the intermediate plate, the adjustment plate, and the bead plate are laminated on each other and the thickness of a portion of the cylinder head gasket that has the stopper portion is set to be greater than the thickness of other portions of the cylinder head gasket, wherein the cylinder head gasket is formed such that, before the cylinder head gasket is provided between the contact surfaces, a space is formed between the stopper portion and the adjustment stopper portion, and that the intermediate plate portion at least partially contacts the adjustment plate portion, and the bead contacts the adjustment plate portion, and wherein the intermediate plate portion has an intermediate bead that is a bead surrounding the combustion chamber opening at the outer side of the stopper portion, and a portion of the intermediate plate portion other than the intermediate bead contacts the adjustment plate portion.

7. The engine according to claim 6, wherein before the cylinder head gasket is provided between the contact surfaces, and when the intermediate plate and the adjustment plate are laminated on each other, the space formed between the stopper portion and the adjustment stopper portion exists over whole surfaces of the stopper portion and the adjustment stopper portion facing each other.

* * * * *